(12) United States Patent
Hasegawa et al.

(10) Patent No.: US 7,304,916 B2
(45) Date of Patent: Dec. 4, 2007

(54) OPTICAL HEAD, INFORMATION STORAGE APPARATUS, OPTICAL HEAD DESIGN APPARATUS, AND OPTICAL HEAD DESIGN PROGRAM STORAGE MEDIUM

(75) Inventors: Shinya Hasegawa, Kawasaki (JP); Fumihiro Tawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/501,257

(22) Filed: Aug. 7, 2006

(65) Prior Publication Data
US 2006/0269218 A1 Nov. 30, 2006

Related U.S. Application Data

(63) Continuation of application No. PCT/JP2004/006532, filed on May 14, 2004.

(51) Int. Cl.
*G11B 7/00* (2006.01)
*G02B 6/00* (2006.01)

(52) U.S. Cl. .................. 369/44.12; 369/126; 385/147

(58) Field of Classification Search .. 369/275.1–275.5, 369/13.01, 112.15, 126, 112.19, 44.12, 116, 369/44.14, 44.17, 44.19; 385/147; 359/224, 359/223; 720/658
See application file for complete search history.

(56) References Cited

U.S. PATENT DOCUMENTS

| | | | |
|---|---|---|---|
| 5,689,480 A | | 11/1997 | Kino |
| 2005/0007937 A1* | | 1/2005 | Mori et al. ............... 369/275.2 |

FOREIGN PATENT DOCUMENTS

| | | |
|---|---|---|
| JP | 55-117108 | 9/1980 |
| JP | 01-312510 | 12/1989 |
| JP | 07-120636 | 5/1995 |
| JP | 09-184930 | 7/1997 |
| JP | 10-206660 | 8/1998 |
| JP | 2000-019091 | 1/2000 |

(Continued)

OTHER PUBLICATIONS

Matsumoto et al.; "Fabrication of a Near-Field Optical Fiber Probe with a Nanomeric Metallized Protrusion"; Optical Review, Vo. 5, No. 6; pp. 369-373; 1998.

(Continued)

*Primary Examiner*—Ali Neyzari
(74) *Attorney, Agent, or Firm*—Greer, Burns & Crain, Ltd.

(57) ABSTRACT

An optical head has a first propagation section made of a first low extinction material and installed along an optical axis, a pair of second propagation sections which, being made of a second low extinction material, sandwich the first propagation section, a pair of first confining sections which, being made of a material with propagation capability lower than that of the second propagation sections, further sandwich the first propagation section and second propagation sections from outside the second propagation sections, and a pair of third propagation sections which, being made of a material with light propagation capability higher than that of the first confining sections, further sandwich the first confining sections from outside. Also, an optical head design apparatus calculates a complex propagation constant along an optical axis by solving an equation which is based on F matrices, and thereby design an optical head in a far-sighted manner.

9 Claims, 12 Drawing Sheets

FOREIGN PATENT DOCUMENTS

| | | |
|---|---|---|
| JP | 2000-195002 | 7/2000 |
| JP | 2000-260050 | 9/2000 |
| JP | 2001-166174 | 6/2001 |
| JP | 2001-192233 | 7/2001 |
| JP | 2002-188579 | 7/2002 |
| JP | 2002-286958 | 10/2002 |
| JP | 2004-030840 | 1/2004 |
| JP | 2004-056307 | 2/2004 |

OTHER PUBLICATIONS

Yatsui et al.; "Increasing throughput of a near-field optical fiber probe over 1000 times by the use of a triple-tapered structure"; Applied Physics Letters, vol. 73, No. 15; pp. 2090-2092; Oct. 12, 1998.

* cited by examiner

OPTICAL HEAD, INFORMATION STORAGE APPARATUS, OPTICAL HEAD DESIGN APPARATUS, AND OPTICAL HEAD DESIGN PROGRAM STORAGE MEDIUM

This is a continuation of International Application No. PCT/JP2004/006532, filed May 14, 2004.

TECHNICAL FIELD

The present invention relates to an optical head which emits and propagates light as well as to an information storage apparatus which uses the optical head.

BACKGROUND ART

With the progress of information society, amounts of information are growing increasingly. To accommodate the growing amounts of information, an information recording system with dramatically high recording density as well as a recorder/reproducer based on such a system are longed for.

As a recording system which implements high recording density, attention is given to a recording system which produces a minute opening smaller than the wavelength of incident light and forms a beam spot smaller than the wavelength of light using light produced through the opening.

Known minute openings for optical recording systems include an opening provided at a sharp tip of an optical fiber as described, for example, in Patent Document 1. The opening is produced by partially cutting off a sharp tip of an optical fiber coated with a metal film, using a particle beam such as a focused ion beam (FIB).

Another conventional technique disclosed in Patent Document 2 involves a sloped opening produced in a flat plate. Specifically, a pattern is produced on a silicon substrate by lithography technique, a recess shaped like an inverted pyramid is created by anisotropic etching of the pattern, and the vertex of the inverted pyramid which forms the deepest part of the substrate penetrates to the back side of the substrate. Known methods of penetration include a method which involves grinding the back side of the silicon substrate and a method which involves etching.

Also, Non-Patent Literature 1 discloses a method for vapor-depositing a metal on a sharp core tip of an optical fiber to improve light propagation efficiency.

Furthermore, Non-Patent Literature 2 discloses a shape of an optical fiber which improves both beam spot size and propagation efficiency.

An optical head disclosed in Patent Document 3 has a planar structure made of a symmetrical two-dimensional pattern with a tip of the head composed of a highly refractive dielectric material of a trapezoidal shape. The patent document 3 discloses a method for reducing spot diameter using an inclined trapezoidal surface and the planar structure.

(Patent Document 1)
Japanese Patent Laid-Open No. 10-206660
(Patent Document 2)
U.S. Pat. No. 5,689,480
(Patent Document 3)
Japanese Patent Laid-Open No. 2002-188579
(Non-Patent Literature 1)
"Optical Review," 1998, Vo. 15, No. 6, pp. 369-373
(Non-Patent Literature 2)
"Applied Physics Letters," Vol. 73, No. 15

However, optical fibers have low usability of light. For example, with an opening of 100 nm, emergent light intensity is not more than 0.001% of incident light intensity. To deal with this situation structures have been proposed such as a structure in which an apical angle changes in steps from the root to the tip of an optical fiber and a structure in which a minute metal ball is formed in the center of the minute opening at the tip. However, methods of forming a minute opening by sharpening a tip of an optical fiber lack uniformity in vapor deposition of a metal film and have a problem of unstable etching speed arising from concentration of etching solutions and material composition of the optical fiber. Furthermore, there are problems accompanying mass production processes, such as instability in the production of sharp circular-conical apical angles of optical fibers and difficulty to control FIB-based cutting of tips. Besides, the use of optical fibers makes it difficult to adopt multiple heads, which is a common means of increasing data transfer speed.

With conventional high-efficiency techniques using optical fibers, the circular-conical shape at the tip surrounded by metal produces lens effect on a circular-conical surface in the optical fiber, causing an electric field in the incident light to concentrate on some location. The technique in Non-Patent Literature 2 reduces beam spot size and improves efficiency by providing an opening in the surface on which the electric field concentrates. Although this method is effective, it requires extremely high machining accuracy and thus has machining problems similar to those described above.

The method which forms a minute opening by etching a semiconductor substrate has problems of instability during fabrication processes, including instability in the etching rate of the opening with a size of tens of nm, instability in the opening size due to nonuniform thickness of the silicon substrate relative to a certain amount of etching, and instability in the shape of etched part due to shifts in crystal orientation during slicing of the semiconductor substrate. Also, the inverted pyramid shape depends on crystal orientation inherent to the semiconductor substrate, and thus it may not be possible to obtain a desired optimum angle. Furthermore, substrates go through a large number of separation and melting processes, consuming materials heavily and resulting in high costs.

In view of the above problems, the optical head proposed in Patent Document 3 has a two-dimensional pattern at its tip, uses a highly refractive material as light propagating material in the head, and thereby reduces the size of a spot on which light and electric field strength concentrate. Also, the optical head has a multilayered structure sandwiching the light propagating material of the two-dimensional pattern, and optical interference among the multiple layers causes light to concentrate on the light propagating material. The two-dimensional pattern and multilayered structure can be created by the application of lithography technique or the like, and thus the optical head can be machined with high accuracy and be easily built integrally with a magnetic sensor head. However, with the conventional structure, it is difficult to design an optical head capable of efficient light propagation to be large enough to allow for manufacture and machining, and there is demand to work out a structure which will provide high light propagation capability even if it is large in size. Also, conventional methods for designing a multilayered structure for such an optical head are inefficient because they involve modifying individual layer thicknesses by checking optical interference among multiple layers via simulation. Thus, a design apparatus capable of more far-sighted design is desired.

DISCLOSURE OF THE INVENTION

In view of the above circumstances, the present invention has an object to provide an optical head which is large in size and high in light propagation capability, information storage apparatus equipped with the optical head and capable of high density information storage, optical head design apparatus which can design the optical head efficiently, and optical head design program storage medium that stores an optical head design program which, when installed on a computer, makes the computer design the optical head efficiently.

To achieve the above object, the present invention provides an optical head, having:

a first propagation section (41 in FIG. 3) made of a first low extinction material and installed along an optical axis from an incident point to an emergent point of light, where the first low extinction material has a complex refractive index whose imaginary part is virtually negligible;

a pair of second propagation sections (42 in FIG. 3) which are made of a second low extinction material and sandwich the first propagation section in at least one cross-axis direction intersecting the optical axis, where the second low extinction material has a complex refractive index whose imaginary part is virtually negligible and whose real part is larger than the real part of the complex refractive index of the first propagation section;

a pair of first confining sections (43 in FIG. 3) which are made of a material with light propagation capability lower than the light propagation capability of the second propagation sections, with zero light propagation capability being acceptable and further sandwich the first propagation section and the second propagation sections from outside the second propagation sections in the cross-axis direction; and a pair of third propagation sections (44 in FIG. 3) which are made of a material with light propagation capability higher than the light propagation capability of the first confining sections and further sandwich the first confining sections from outside in the cross-axis direction, and are thicker in the cross-axis direction than the first confining sections.

The statement "sandwich . . . at least one cross-axis direction" means that the structure here can be any of a multilayered structure which has one cross-axis direction, lattice structure which has multiple cross-axis directions, multi-tubular structure in which all directions around the optical axis are cross-axis directions, and so on.

The optical head according to the present invention has the second propagation sections which greatly reduce loss of the light propagating through the optical head and concentrate light efficiently on the optical axis. Consequently, the optical head has high light propagation capability even though it is large in size.

Preferably the optical head according to the present invention further has:

a pair of second confining sections (45 in FIG. 3) which are made of a material with light propagation capability lower than the light propagation capability of the third propagation sections, with zero light propagation capability being acceptable, further sandwich the third propagation sections from outside in the cross-axis direction, and are thicker in the cross-axis direction than the first confining sections;

a pair of fourth propagation sections (46 in FIG. 3) which are made of a material with light propagation capability higher than the light propagation capability of the second confining sections and further sandwich the second confining sections from outside in the cross-axis direction; and a pair of third confining sections (47 in FIG. 3) which are made of a material with light propagation capability lower than the light propagation capability of the fourth propagation sections, with zero light propagation capability being acceptable and further sandwich the fourth propagation sections from outside in the cross-axis direction.

The existence of the second confining sections, fourth propagation sections, and third confining sections further improves concentration of light on the optical axis.

In the optical head according to the present invention, preferably the fourth propagation sections and the third confining sections are made of the same materials as the third propagation sections and the second confining sections, respectively, and have a total thickness in the cross-axis direction larger than total thickness of the third propagation sections and the second confining sections.

The optical head of the preferred configuration can further concentrate light on the optical axis by reducing side lobe of the light propagating through the optical head.

To achieve the above object, the present invention provides an information storage apparatus which emits light to a predetermined information storage medium and uses the emitted light for at least one of information reproduction and information recording, having:

an optical head; and a light guide section which admits light through an incident point of the optical head into the optical head, wherein the optical head has:

a first propagation section made of a first low extinction material and installed along an optical axis from an incident point to an emergent point of light, where the first low extinction material has a complex refractive index whose imaginary part is virtually negligible;

a pair of second propagation sections which are made of a second low extinction material and sandwich the first propagation section in at least one cross-axis direction intersecting the optical axis, where the second low extinction material has a complex refractive index whose imaginary part is virtually negligible and whose real part is larger than the real part of the complex refractive index of the first propagation section; and a pair of first confining sections which are made of a material with light propagation capability lower than the light propagation capability of the second propagation sections, with zero light propagation capability being acceptable and further sandwich the first propagation section and the second propagation sections from outside the second propagation sections in the cross-axis direction.

The information storage apparatus according to the present invention allows light guided by an optical waveguide to concentrate on the optical axis by the optical head efficiently, forming a small focused spot, and thereby implements high density information storage.

Only a basic form of the information storage apparatus according to the present invention is described here, but the information storage apparatus according to the present invention includes various forms corresponding to the various forms of the optical head described earlier in addition to the basic form described above.

Preferably, the information storage apparatus according to the present invention has a magnetic head formed integrally with the optical head, wherein the magnetic head applies a magnetic field to the information storage medium and the applied magnetic field is used for at least one of information reproduction and information recording. With the preferred form of the information storage apparatus, since the optical head and magnetic head are formed integrally, it is possible to avoid relative misalignment between the two heads during assembly or operation control. Consequently, the apparatus can easily be designed to be highly accurate.

Also, in the information storage apparatus according to the present invention, preferably the optical head approaches to one tenth the wavelength of the emitted light or less from the information storage medium.

By bringing the optical head close to the information storage medium, it is possible to produce nearfield light, and thereby illuminate the information storage medium efficiently with the light.

To achieve the above object, the present invention provides an optical head design apparatus having:

a thickness setting section which sets thickness of each layer in an optical head which has a layered structure in at least one cross-axis direction intersecting an optical axis from an incident point to an emergent point of light;

a propagation constant calculation section which calculates a complex propagation constant $\Lambda$ by solving an equation containing the complex propagation constant $\Lambda$ as a variable and expressed in terms of the product of F matrices of layers which represent propagation of an electromagnetic field across the respective layers and a boundary condition that impedance (magnetic field/electric field) on the optical axis is zero, where each of the F matrices is given by

[Formula 1]

$$F_n = \begin{bmatrix} \cos(\beta_n d_n) & \frac{ik_0 \varepsilon_n}{\beta_n} \sin(\beta_n d_n) \\ \frac{i\beta_n}{k_0 \varepsilon_n} \sin(\beta_n d_n) & \cos(\beta_n d_n) \end{bmatrix} \quad (1)$$

(where $d_n$ is thickness of the n-th layer, $\varepsilon_n$ is complex permittivity of the n-th layer, $\beta_n = \sqrt{(\varepsilon_n k_0^2 - \Lambda^2)}$ is a phase propagation constant of the n-th layer, $k_0$ is a wave number of incident light, and $\Lambda$ is the complex propagation constant which, being common to the layers, represents light propagation capability along the optical axis);

a performance evaluation section which evaluates light propagation performance in the layered structure based on the complex propagation constant $\Lambda$ calculated by the propagation constant calculation section; and a thickness correction section which makes the propagation constant calculation section recalculate the complex propagation constant, by correcting the thicknesses of the layers based on results of the evaluation made by the performance evaluation section.

Since the optical head design apparatus according to the present invention allows the propagation performance of the layered structure to be determined using the complex propagation constant $\Lambda$ calculated easily as a solution to the equation which is based on F matrices, it enables far-sighted design of an optical head, making it possible to obtain desired propagation performance by repeating adjustment of layer thicknesses.

In the optical head design apparatus according to the present invention, preferably the performance evaluation section makes an evaluation by approving a large real part of the complex propagation constant and disapproving a large imaginary part of the complex propagation constant.

The preferred optical head design apparatus makes it easy to obtain an optical head with a large effective refractive index and a small propagation loss, where the effective refractive index is represented by the real part of the complex propagation constant and the propagation loss is represented by the imaginary part of the complex propagation constant.

To achieve the above object, the present invention provides an optical head design program storage medium that stores an optical head design program which, when installed in a computer system, constructs in the computer system:

a thickness setting section which sets thickness of each layer in an optical head which has a layered structure in at least one cross-axis direction intersecting an optical axis from an incident point to an emergent point of light;

a propagation constant calculation section which calculates a complex propagation constant which represents light propagation capability along the optical axis by solving an equation containing the complex propagation constant as a variable and expressed in terms of the product of F matrices of layers which represent propagation of an electromagnetic field across the respective layers and a boundary condition that impedance on the optical axis is zero, where each of the F matrices is given by

[Formula 2]

$$F_n = \begin{bmatrix} \cos(\beta_n d_n) & \frac{ik_0 \varepsilon_n}{\beta_n} \sin(\beta_n d_n) \\ \frac{i\beta_n}{k_0 \varepsilon_n} \sin(\beta_n d_n) & \cos(\beta_n d_n) \end{bmatrix} \quad (1)$$

(where $d_n$ is thickness of the n-th layer, $\varepsilon_n$ is complex permittivity of the n-th layer, $\beta_n = \sqrt{(\varepsilon_n k_0^2 - \Lambda^2)}$ is a phase propagation constant of the n-th layer, $k_0$ is a wave number of incident light, and $\Lambda$ is the complex propagation constant which, being common to the layers, represents light propagation capability along the optical axis);

a performance evaluation section which evaluates light propagation performance in the layered structure based on the complex propagation constant calculated by the propagation constant calculation section; and a thickness correction section which makes the propagation constant calculation section recalculate the complex propagation constant, by correcting the thicknesses of the layers based on results of the evaluation made by the performance evaluation section.

The optical head design program according to the present invention allows the computer system to easily construct components of the optical head design apparatus.

Incidentally, only a basic form of the optical head design program storage medium according to the present invention is described here, but this is for the purpose of avoiding redundancy, and the optical head design program storage medium according to the present invention includes various forms corresponding to the various forms of the optical head design apparatus described earlier in addition to the basic form described above.

The computer system on which the optical head design program according to the present invention is installed may include a single computer with peripheral devices or may include multiple computers.

Furthermore, regarding the propagation constant calculation section and other elements constructed on the computer by the optical head design program according to the present invention, one element may be constructed either by a single program component or by multiple program components. Also, each element may be constructed so as to execute its operation either by itself or by giving instructions to other programs or program components installed on the computer.

BEST MODE FOR CARRYING OUT THE INVENTION

Embodiments of the present invention will be described below.

Figure 1:
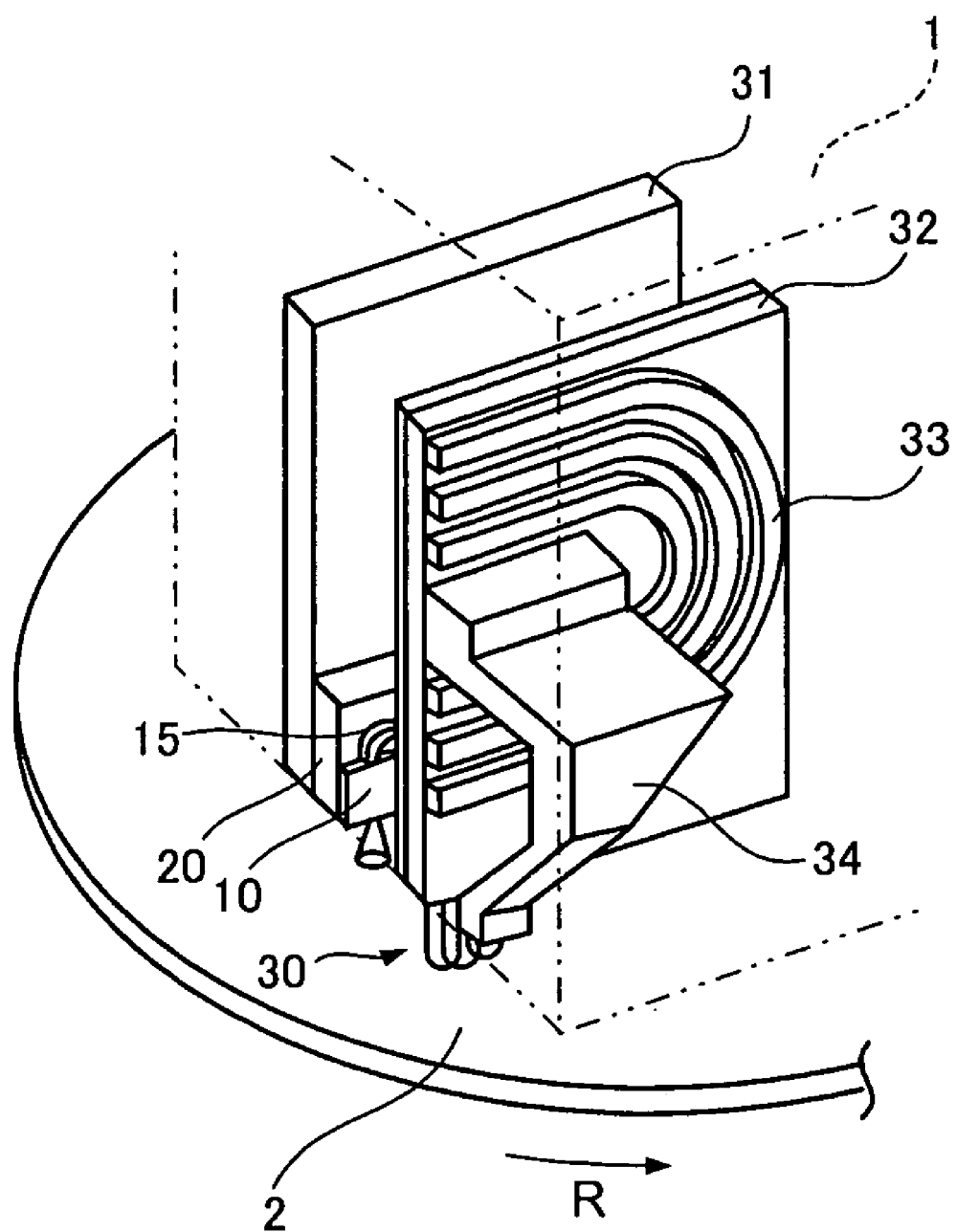
FIG. 1 is a perspective view showing a first embodiment of an information storage apparatus according to the present invention.

FIG. 1 is a perspective view showing a first embodiment of an information storage apparatus according to the present invention. FIG. 1 shows a light-assisted information storage apparatus which has a head 1 and information storage medium 2, and the head 1 records and reproduces information on/from the information storage medium 2. However, only the head 1 and its vicinity are shown in FIG. 1. Other component parts are equivalent to those of known light-assisted information storage apparatus, and thus description thereof will be omitted.

The head 1 of the information storage apparatus consists of an optical head 10, reproducing magnetic sensor head 20, and recording magnetic head 30 formed as a single unit by lithography technique and placed close to the information storage medium 2 which rotates in the direction of an arrow R. The optical head 10 corresponds to a first embodiment of the optical head according to the present invention.

The optical head 10 and reproducing magnetic sensor head 20 are formed between an upper magnetic shield 32 and a lower magnetic shield 31, where the upper magnetic shield 32 also serves as a lower core of the recording magnetic head 30. The optical head 10 is connected with an optical waveguide 15 which guides light from a light source. The optical waveguide 15 is an example of the light guide section according to the present invention.

The optical head 10 emits the light guided by the optical waveguide 15, to the information storage medium 2. However, the light is not emitted as a propagating wave. It is unevenly distributed as an oscillating electric field in the vicinity of the optical head 10 (at a distance of not more than one tenth the wavelength of light) and when the optical head 10 comes close enough to the information storage medium 2, the oscillating electric field acts in a manner similar to light acting as a wave.

The recording magnetic head 30 consists of the upper magnetic shield 32 which also serves as the lower core, a magnetic-field generating coil 33, and an upper core 34. A magnetic field is generated in a gap between the lower core and upper core 34.

As the information storage medium 2 rotates, that location on the information storage medium 2 in which desired information is recorded or reproduced passes through the reproducing magnetic sensor head 20, optical head 10, and recording magnetic head 30 in this order. To record information, a desired location on the information storage medium 2 is heated by light emission from the optical head 10, immediately followed by an application of a magnetic field from the recording magnetic head 30. This makes it possible to record information at low magnetic field strength. On the other hand, to reproduce information, the magnetization direction at a desired location is detected by the reproducing magnetic sensor head 20, thereby reproducing the information.

Since spacing between the recording magnetic head 30 and optical head 10 is not larger than a few μm, the head 1 structured as described above has the advantage that skew between magnetic field optical and light optical in the circumferential direction from the outer diameter to the inner diameter of the information storage medium 2 is negligible. Also, a light spot emitted by the optical head 10 to the information storage medium 2 is slightly longer in the circumferential direction. This enables so-called crescent recording by means of magnetic field laser pulse modulation, and thus denser packing of information.

Regarding tracking, a sampled-servo system is used as in the case of tracking technique for magnetic disk recording. This allows high-precision tracking.

Next, the structure of the optical head 10 will be described in detail.

Figure 2:
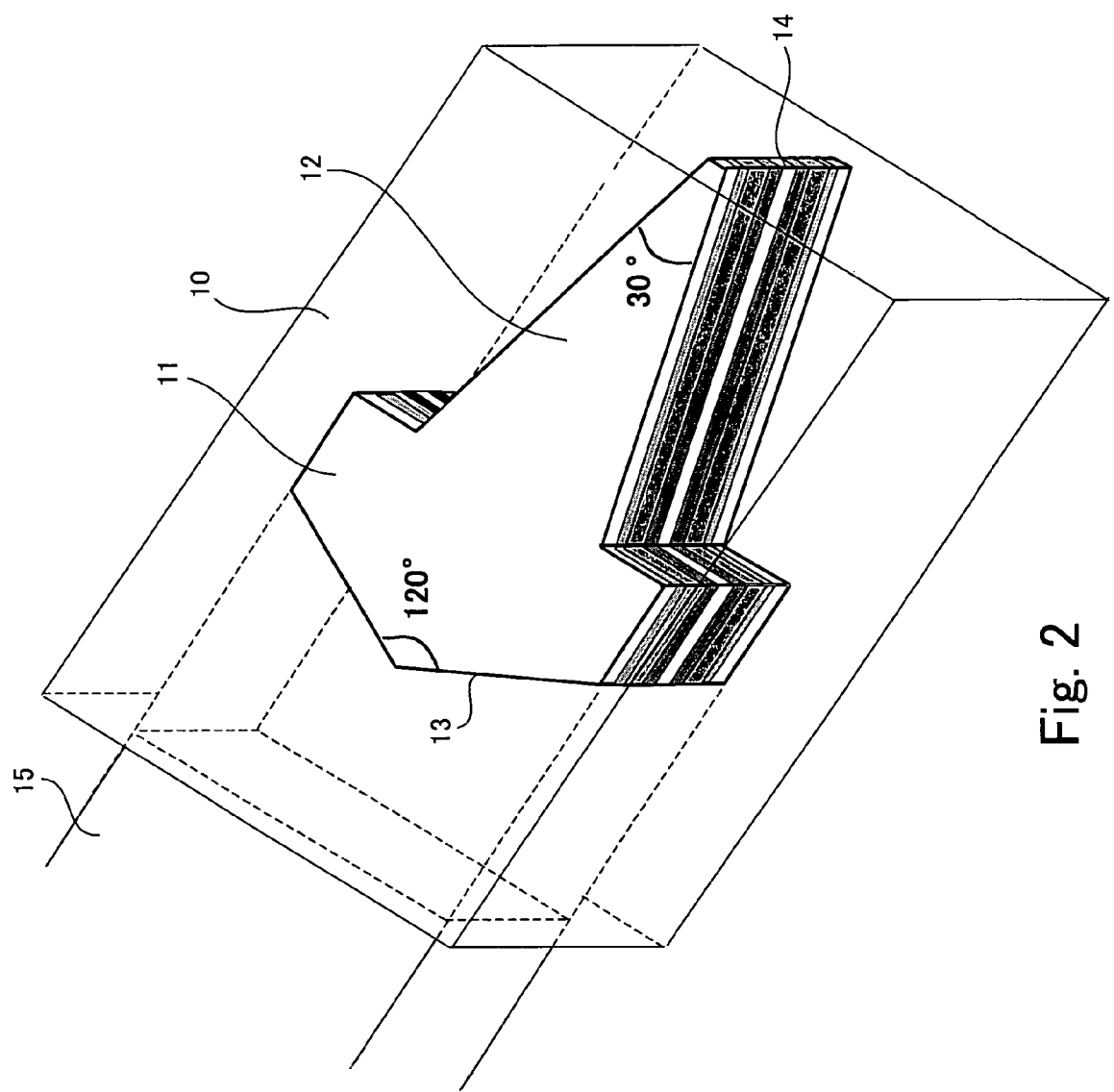
FIG. 2 is an enlarged perspective view of an optical head.

FIG. 2 is an enlarged perspective view of an optical head.

As described above, the optical head 10 is connected with the optical waveguide 15. The optical waveguide 15 is constructed using a dielectric material such as $SiO_2$ or $MgF_2$ for its core. The optical head 10 has a light guide section 11, tip 12 with an apical angle of 30°, entrance plane 13 bent 120° in the center, and exit plane 14. Vicinities of the light guide section 11 and tip 12 are covered with aluminum. The light guided by the optical waveguide 15 enters the light guide section 11 through the entrance plane 13, propagates to the tip 12, and exits through the exit plane 14 as a light spot.

The light guide section 11 and tip 12 of the optical head 10 have a multilayered structure, which reduces the light spot size on the exit plane 14. The light spot size is also reduced in proportion to the apical angle of the tip 12. On the other hand, the smaller the apical angle of the tip 12, the longer the tip 12, and so is propagated distance of light. Consequently, electromagnetic fields are strongly attenuated by absorption and wavelength limits, and thus the optical head 10 has a low propagation efficiency for electromagnetic fields. The higher the propagation efficiency of an optical head, the more desirable. Thus, generally the apical angle is determined by a compromise between two contradictory performance criteria: light spot size and propagation efficiency.

The present invention improves the propagation constant itself of the light guide section 11 and tip 12 by designing the layered structure of the light guide section 11 and tip 12 in an ingenious way. Consequently, the optical head 10 has high overall capabilities as described in detail later.

Figure 3:
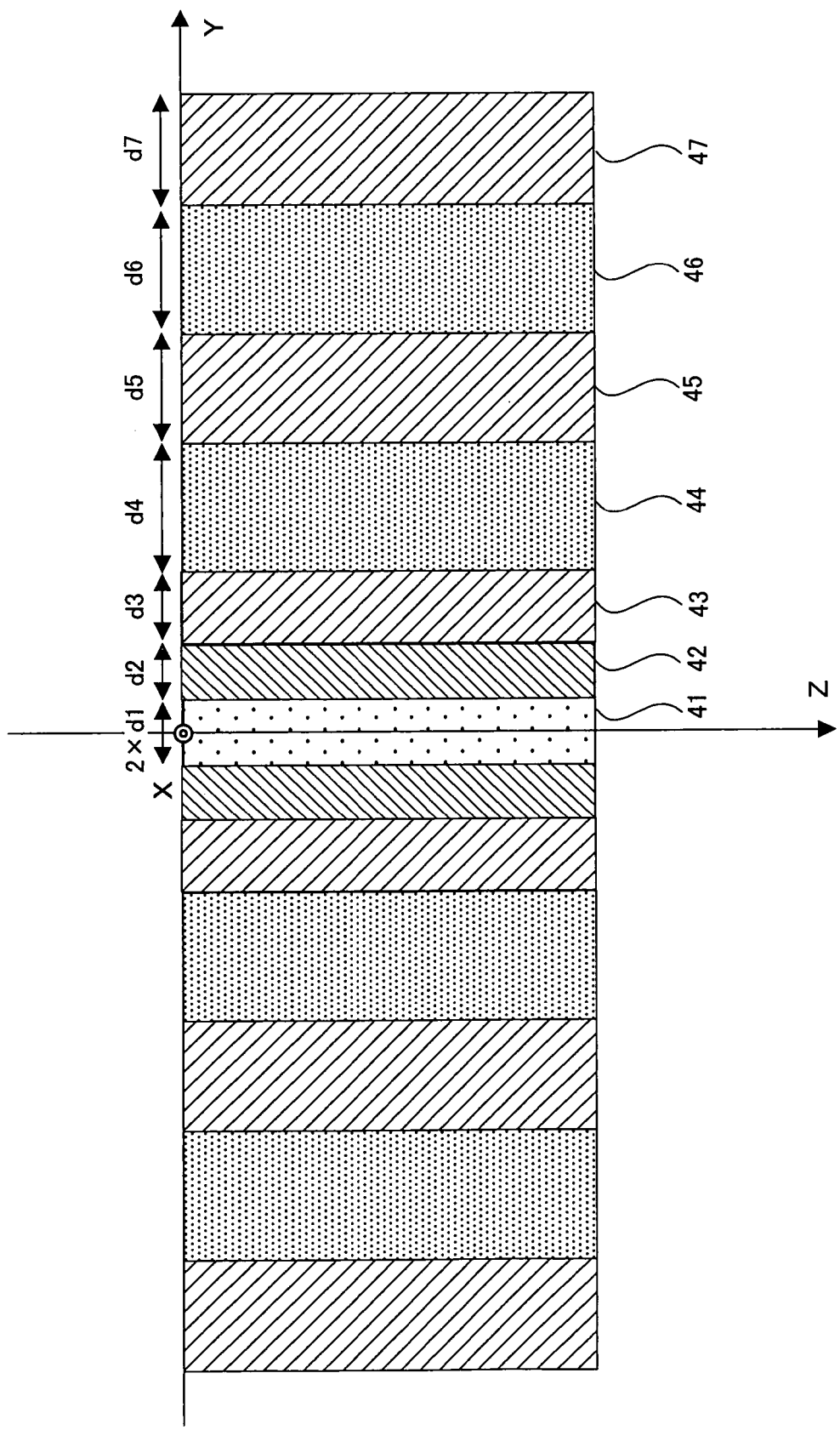
FIG. 3 is an explanatory diagram illustrating a layered structure.

FIG. 3 is an explanatory diagram illustrating a layered structure.

First, a concept of the optical head's layered structure described above will be described, and then a layered structure actually used in this embodiment will be described. The Z axis shown in FIG. 3 corresponds to the optical axis of the optical head and the direction of the Y axis corresponds to one example of the cross-axis directions according to the present invention. The X axis is perpendicular to the plane of the drawing and each layer of the optical head is parallel to the X-Z plane.

In the center of the layered structure shown in FIG. 3, there are a first layer 41 along the optical axis, a pair of second layers 42 sandwiching the first layer 41 along the Y axis, a pair of third layers 43 sandwiching the first layer 41 and second layers 42 along the Y axis, and a pair of fourth layers 44 sandwiching the third layers 43 from outside along the Y axis.

The first layer 41 is made of such a material that the imaginary part of its complex refractive index for incident light is small enough to be virtually negligible. For example, in the case of light with a wavelength of 400 nm, available materials include: $SiO_2$ (1.567), $Al_2O_3$ (1.786), MgO (1.761), BeO (1.729), NaCl (1.567), KCl (1.511), $(C_2H_4)n$ (1.495), $BaF_2$ (1.483), $CaF_2$ (1.442), LiF (1.399), $MgF_2$ (1.384), NaF (1.332), and ZrN (0.995) (where the values in the parentheses are values of the real part of the complex refractive index). These materials are examples of the first low extinction material according to the present invention and the first layer 41 is an example of the first propagation section according to the present invention.

The second layers 42 are made of such a material that the imaginary part of its complex refractive index for incident light is also small enough to be virtually negligible and that the real part of the complex refractive index is larger than that of the first layer 41. For example, in the case of light with a wavelength of 400 nm, available materials include: ZnS (2.437), $KNbO_3$ (2.465), diamond (2.463), $LiNbO_3$ (2.432), AgBr (2.416), $LiTaO_3$ (2.183), YAG (1.865), $Al_2O_3$ (1.786), BeO (1.729), NaCl (1.567), $SiO_2$ (1.567), $(C_2H_4)n$ (1.495), $BaF_2$ (1.483), $CaF_2$ (1.442), $CaF_2$ (1.384), NaF (1.332), KCl (1.511), BN (2.079), LiF (1.399), MgO (1.761), TlCl (2.505), $Si_3N_4$ (2.066), KRS-6 (2.575), BSO (2.983), $PbF_2$ (1.818), AgCl (2.020), and $TiO_2$ (3.0) (where the values in the parentheses are values of the real part of the complex refractive index). These materials are examples of the second low extinction material according to the present invention and the second layers 42 are an example of the second propagation sections according to the present invention.

The third layers 43 are made of a material with light propagation capability lower than that of the second layers 42. Specifically, available materials include metal materials as well as highly refractive materials whose complex refractive index has a real part larger than that of the second layers 42. The lower light propagation capability here is represented by a large imaginary part of the refractive index while high light propagation capability is represented by a small imaginary part of the refractive index. In the case of metal materials, desirably permittivity for incident light is negative. For example, in the case of light with a wavelength of 400 nm, available materials include: metal materials such as Al, Au, and Cu and highly refractive materials such as AlSb, $Al_{0.099}Ga_{0.901}As$, Se, InP, a-Si, GaAs, $Al_{0.7}Ga_{0.3}As$, GaP, $Al_{0.804}Ga_{0.196}As$, Ge, $Zn_3P_2$, AlAs, GaSb, GeTe—$Sb_2Te_3$—Sb, $CdGeAs_2$, $ZnGeP_2$, PbS, Re, $\epsilon$-GeSe, Os, CdTe, InSb, ZnTe, $TiO_2$, W, Se, InAs, Mo. The third layers 43 are an example of the first confining sections according to the present invention. Incidentally, the use of a metal material for the third layers 43 provides the advantage of increasing the propagation efficiency of the layered structure as a whole, but the optical head itself may yield to heat due to a low melting point if it is used for heating with an intensely focused spot. On the other hand, as a material for the third layers 43, it is easier to select heat-resistant material from among highly refractive materials, which, however, have lower propagation efficiency than metal materials.

The fourth layers 44 are made of a material with light propagation capability higher than that of the third layers 43, but the imaginary part of its complex refractive index may be significant.

In the layered structure shown in FIG. 3, there are a pair of fifth layers 45 sandwiching the fourth layers 44 from outside along the Y axis, a pair of sixth layers 46 sandwiching the fifth layers 45 from outside along the Y axis, and a pair of seventh layers 47 sandwiching the sixth layers 46 from outside along the Y axis.

The fifth layers 45 are made of a material with light propagation capability lower than that of the fourth layers 44, the sixth layers 46 are made of a material with light propagation capability higher than that of the fifth layers 45, and the seventh layers 47 are made of a material with light propagation capability lower than that of the sixth layers 46.

In this way, in the layered structure shown in FIG. 3, basically, layers with high light propagation capability and layers with low light propagation capability alternate with each other and the second layers 42 with high light propagation capability are added in the second place from the center. The layers are broadly divided into two: the first layer 41 to the third layers 43 are thin layers; and the fourth layers 44 and outer layers are thick layers. The light which propagates along the Z axis interferes among the individual layers of this layered structure and concentrates on the first layer 41 as described later. A layered structure which contains the second layers 42 described above provides an optical head with high light propagation capability because it attenuates light which propagates along the Z axis far less than does a layered structure which does not contain such second layers 42.

In the first embodiment shown in FIGS. 1 and 2, the first layer 41, fourth layers 44, and sixth layers 46 are made of $SiO_2$; the third layers 43, fifth layers 45, and seventh layers 47 are made of Si; and the second layers 42 are made of ZnS.

Incidentally, after materials are selected concretely, to actually obtain a layered structure which causes very small attenuation to light, it is necessary that layer thicknesses d1 to d7 of the first layer 41 to the seventh layers 47 should be designed appropriately. Conventionally, when designing layer thicknesses, the entire optical head is divided into a fine mesh and electromagnetic field strength at each mesh point is calculated via computer simulation to check performance. However, such computer simulations require a great deal of calculation time and makes design short-sighted. Consequently, it takes an immense amount of time and effort to reach optimum layer thicknesses.

Thus, an embodiment of an optical head design apparatus which can easily design optimum layer thicknesses will be described below. When an optical head design program stored in an embodiment of an optical head design program according to the present invention is installed in a computer system, the computer system operates as an embodiment of the optical head design apparatus according to the present invention.

Figure 4:
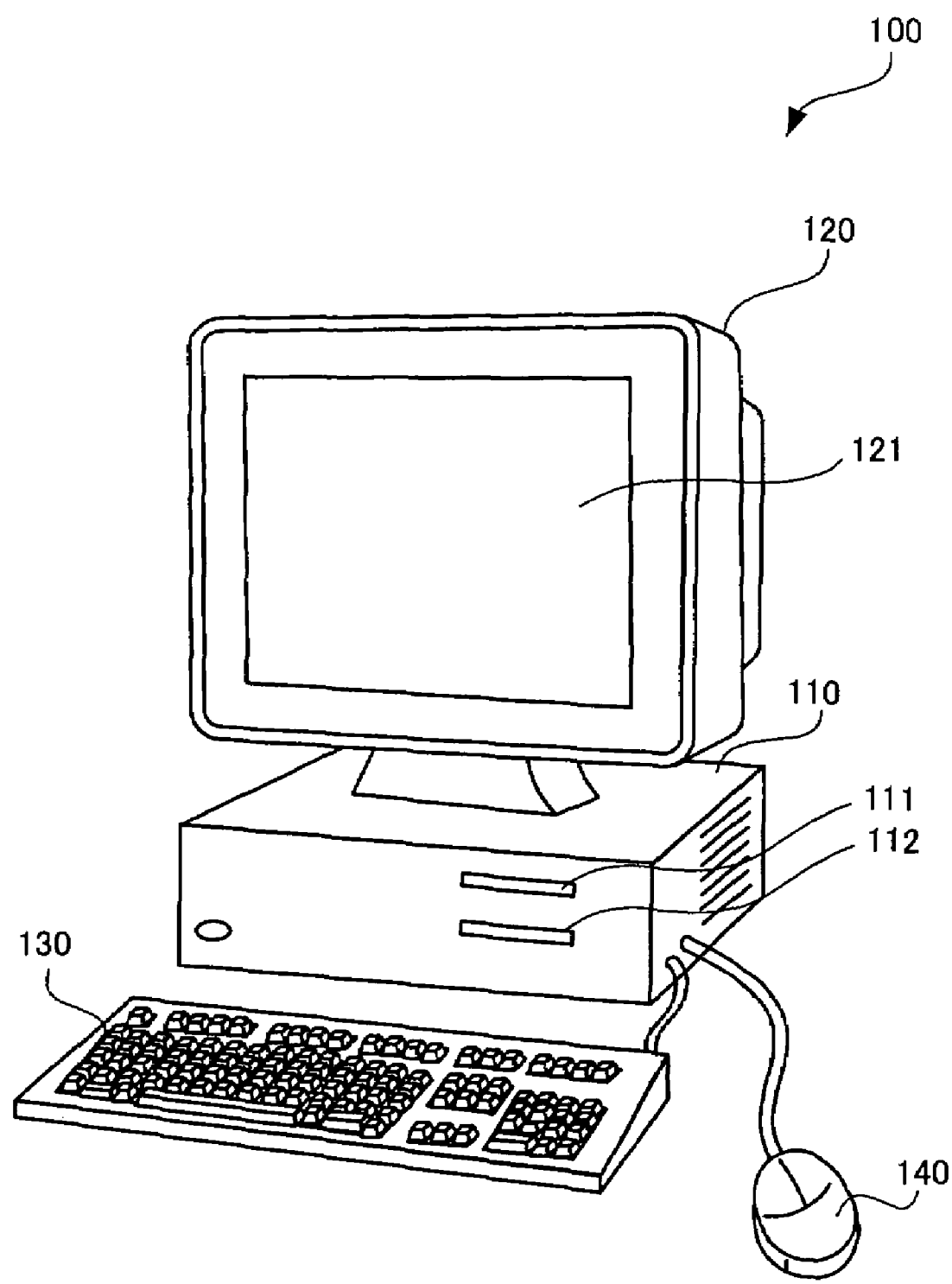
FIG. 4 is an external view of a computer system which operates as an optical head design apparatus.

FIG. 4 is an external view of a computer system which operates as an optical head design apparatus.

The computer system 100 is equipped with a main body 110 containing a CPU, RAM memory, hard disk, and the like; CRT display 120 which presents a screen display on a phosphor screen 121 on instructions from the main body 110; keyboard 130 for use to input user commands and character information in the computer system; and mouse 140 for use to specify a desired location on the phosphor screen 121 and thereby input a command corresponding to the location.

When viewed from outside, the main body 110 is equipped with a flexible disk slot 111 used to mount a flexible disk and a CD-ROM slot 112 used to mount a CD-ROM. Also, the main body 110 contains a flexible disk drive which drives the mounted flexible disk and CD-ROM drive which drives the mounted CD-ROM.

The CD-ROM contains the optical head design program according to the present invention. When the CD-ROM is mounted in the main body 110 through the CD-ROM slot 112, the optical head design program is installed on a hard disk of the computer system from the CD-ROM by the CD-ROM drive. When the optical head design program installed on the hard disk of the computer system is started, the computer system operates as an embodiment of the optical head design apparatus according to the present invention.

Figure 5:
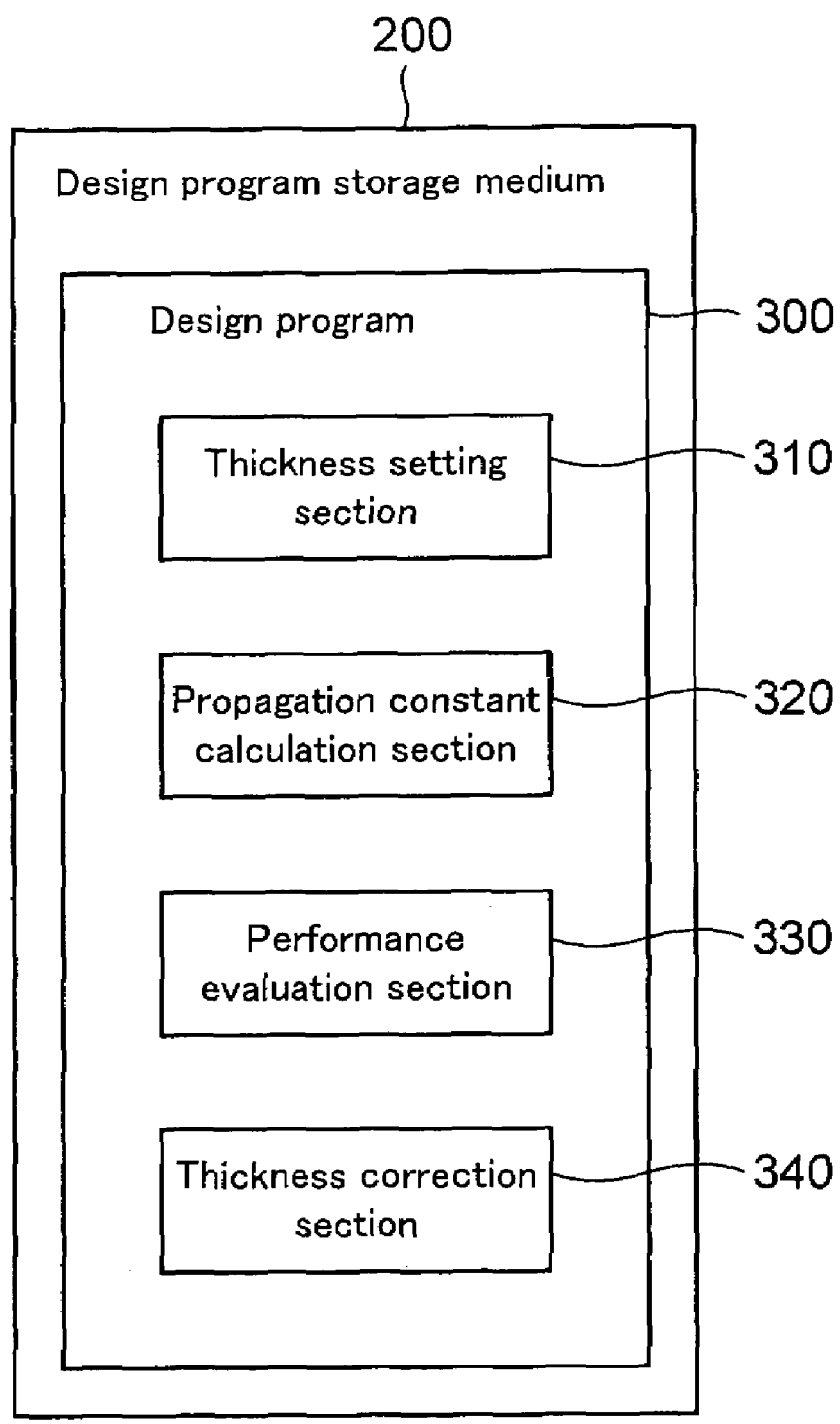
FIG. 5 is a diagram showing an embodiment of an optical head design program storage medium according to the present invention.

FIG. 5 is a diagram showing an embodiment of the optical head design program storage medium according to the present invention.

FIG. 5 shows a design program storage medium 200 containing a design program 300. The design program storage medium 200 storing the design program 300 is an embodiment of the optical head design program storage medium according to the present invention.

The design program storage medium 200 shown in FIG. 5 may be of any type as long as it is a storage medium containing the design program 300. It may be a CD-ROM on which the design program 300 is stored, a hard disk on which the design program 300 has been loaded and stored, or a flexible disk onto which the design program 300 has been downloaded.

The design program 300 is executed in the computer system 100 shown in FIG. 4 and thereby makes the computer system 100 operate as an optical head design apparatus which designs the layer thicknesses of the individual layers in a layered structure such as shown in FIG. 3. It has a thickness setting section 310, propagation constant calculation section 320, performance evaluation section 330, and thickness correction section 340.

The thickness setting section 310, propagation constant calculation section 320, performance evaluation section 330, and thickness correction section 340 construct the thickness setting section, propagation constant calculation section, performance evaluation section, and thickness correction section according to the present invention, respectively, in the computer system.

Elements of the design program 300 will be described in detail later.

Figure 6:
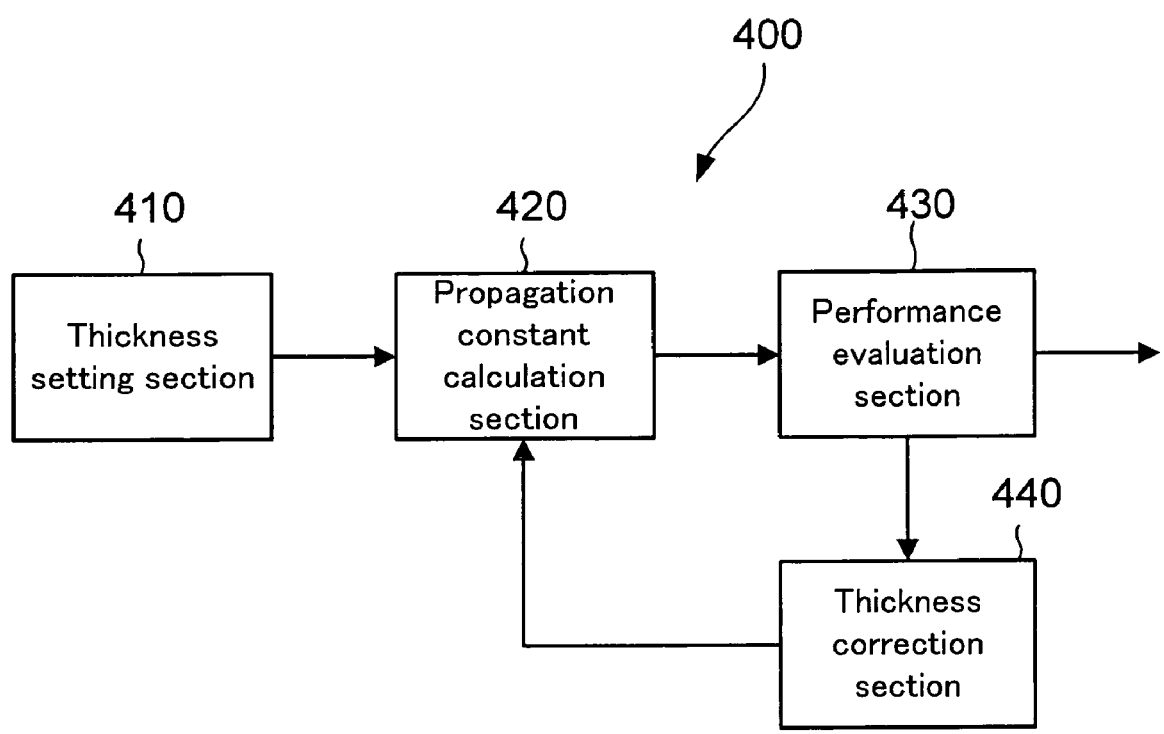
FIG. 6 is a functional block diagram showing an embodiment of an optical head design apparatus according to the present invention.

FIG. 6 is a functional block diagram showing an embodiment of an optical head design apparatus according to the present invention.

The optical head design apparatus 400 is constructed as the design program 300 in FIG. 5 is installed and executed in the computer system 100 shown in FIG. 4.

The optical head design apparatus 400 consists of a thickness setting section 410, propagation constant calculation section 420, performance evaluation section 430, and thickness correction section 440. The thickness setting section 410, propagation constant calculation section 420, performance evaluation section 430, and thickness correction section 440 are constructed in the computer system, respectively, by the thickness setting section 310, propagation constant calculation section 320, performance evaluation section 330, and thickness correction section 340 which compose the design program 300 shown in FIG. 5. In this way, the elements in FIGS. 5 and 6 correspond to each other, but whereas the elements in FIG. 6 are provided by a combination of hardware of the computer system 100 shown in FIG. 4 and the OS and application programs run on the personal computer, the elements of the optical head design program shown in FIG. 5 are provided by only the application programs.

The thickness setting section 410, propagation constant calculation section 420, performance evaluation section 430, and thickness correction section 440 are examples of the thickness setting section, propagation constant calculation section, performance evaluation section, and thickness correction section according to the present invention, respectively.

The elements of the optical head design apparatus 400 shown in FIG. 6 will be described below, thereby also describing the elements of the design program 300 in FIG. 5 in conjunction.

The thickness setting section 410 of the optical head design apparatus 400 in FIG. 6 is provided by the keyboard 130 and mouse 140 shown in FIG. 4 in hardware terms. It sets the complex permittivity $\varepsilon_n$ and layer thickness $d_n$ of the first layer 41 to the seventh layers 47 (collectively referred to as the n-th layer) shown in FIG. 3 in response to settings made by the user of the optical head design apparatus 400. The complex permittivity $\varepsilon_n$ is converted uniquely from the complex refractive index of the material composing the n-th layer. The layer thickness $d_n$ of the n-th layer is provided as an initial design value. Regarding the layer thickness $d_1$ of the first layer 41 shown in FIG. 3, half the actual layer thickness is used.

The propagation constant calculation section 420 determines an F matrix $F_n$ of each layer by substituting the complex permittivity $\varepsilon_n$ and layer thickness $d_n$ set by the thickness setting section 410 into the following equitation.

[Formula 3]

$$F_n = \begin{bmatrix} \cos(\beta_n d_n) & \frac{ik_0 \varepsilon_n}{\beta_n} \sin(\beta_n d_n) \\ \frac{i\beta_n}{k_0 \varepsilon_n} \sin(\beta_n d_n) & \cos(\beta_n d_n) \end{bmatrix} \quad (1)$$

where a phase propagation constant $\beta_n$ of the n-th layer is expressed as follows using a wave number of incident light $k_0$ and complex propagation constant $\Lambda$ which, being common to the layers, represents light propagation capability along the optical axis:

$$\beta_n = \sqrt{\epsilon_n k_0^2 - \Lambda^2} \qquad \text{[Formula 4]}$$

The F matrix Fn represents relationship between an electric field V and magnetic field X by ignoring electric field distribution and magnetic field distribution on both sides of each layer. Correspondence of an electric field V(0) and magnetic field X(0) on the Z axis to an electric field V(7) and magnetic field X(7) outside the seventh layer is expressed as follows using a general F matrix Ft of the seven layers when the positive direction of Y is viewed from the Z axis:

[Formula 5]
$$\begin{bmatrix} X(0) \\ V(0) \end{bmatrix} = [F_t] \begin{bmatrix} X(7) \\ V(7) \end{bmatrix} = \begin{bmatrix} A_t & B_t \\ C_t & D_t \end{bmatrix} \begin{bmatrix} X(7) \\ V(7) \end{bmatrix} \qquad (2)$$

Now if impedance Z(n) of the electromagnetic field is defined to be Z(n)=V(n)/X(n), impedance Z(0) on the Z axis is given by

[Formula 6]
$$Z(0) \equiv Z(\Lambda^2) = \frac{V(0)}{X(0)} = \frac{C_t X(7) + D_t V(7)}{A_t X(7) + B_t V(7)} \qquad (3)$$

Z($\Lambda^2$) in Equation (3) indicates that the impedance Z(0) is regarded as a function of the square of the complex propagation constant $\Lambda$. Also, impedance Z(7) of the electromagnetic field outside the seventh layer equals impedance in the air, and thus, $$Z(7) = V(7)/X(7) = \sqrt{k_0^2 - \Lambda^2}/k_0^2 \qquad \text{[Formula 7]}$$

A condition for light to be able to propagate through the center of the first layer (i.e., on the Z axis)—this condition is known in the transmission, communications, and other fields as a transverse resonance condition—is that the impedance Z(0) on the Z axis should be zero. Thus, Equation (3) is rewritten as follows:

[Formula 8]
$$Z(\Lambda^2) = \frac{C_t + D_t Z(7)}{A_t + B_t Z(7)} = 0 \qquad (4)$$

The propagation constant calculation section 420 solves Equation (4) for the square of the complex propagation constant $\Lambda$ to calculate the complex propagation constant $\Lambda$. Equation (4) can be solved easily through numerical calculations.

Once the propagation constant calculation section 420 calculates the complex propagation constant $\Lambda$, the performance evaluation section 430 evaluates the light propagation performance in the layered structure shown in FIG. 3 based on the complex propagation constant $\Lambda$. According to this embodiment, the performance evaluation section 430 evaluates the propagation performance using the following evaluation function E.

[Formula 9]
$$E = W_1 \times (1/Re(\Lambda))^2 + W_2 \times (Im(\Lambda))^2 + W_3 \times \phi^2 \qquad (5)$$

where W1, W2, and W3 are arbitrary weights given to individual terms; Re($\Lambda$) is the real part of the complex propagation constant $\Lambda$; Im($\Lambda$) is the imaginary part of the complex propagation constant $\Lambda$; and $\phi$ is a function which depends on the shape of an eigenfunction of propagation through the layered structure.

The eigenfunction is calculated using the F matrix Fn represented by Equation (1) above. Specifically, the calculated value of the complex propagation constant $\Lambda$ is substituted into the F matrix Fn in Equation (1), the value of dn is replaced with amounts of change $\Delta Y$ of Y coordinate values in FIG. 3, the electric field V and magnetic field X at individual locations in the positive and negative directions of Y are determined sequentially from the electric field V and magnetic field X at an arbitrary location in the layered structure using the F matrix Fn, and the values of the electric field V and magnetic field X thus determined provide the values of the eigenfunction at the individual locations. These values of the eigenfunction are calculated by the performance evaluation section 430. Any function may be adopted as the function $\phi$ based on design objectives as long as its values increase as the eigenfunction takes larger values outside the boundary between the third layers 43 and the fourth layers 44 shown in FIG. 3 and smaller values inside the boundary when calculated in the above manner. For example, it may be provided simply as the quotient obtained by dividing the sum of the values of the eigenfunction outside the boundary by the sum of the values of the eigenfunction inside the boundary.

The smaller the value of the evaluation function E represented by the Equation (5), the higher the propagation performance is regarded to be by the performance evaluation section 430. That is, a larger value of the real part Re($\Lambda$) which represents an effective refractive index, a smaller value of the imaginary part Im($\Lambda$) which represents propagation loss, and a smaller side lobe outside the fourth layers in the eigenfunction correspond to a higher performance evaluation.

Once the propagation performance of the layered structure is evaluated by the performance evaluation section 430, the thickness correction section 440 corrects the layer thickness dn of each layer in such a way as to reduce the value of the evaluation function E. The correction can be made using a known technique, and thus detailed description thereof will be omitted. There are various techniques for determining a desirable direction and amount of correction through analytical approaches based on Equation (4) and correction of layer thickness dn on a trial basis. Appropriate corrections to the layer thickness dn are made efficiently using such a technique.

Once the layer thickness dn of each layer is corrected by the thickness correction section 440, the propagation constant calculation section 420 calculates the complex propagation constant $\Lambda$ again and the performance evaluation section 430 evaluates the propagation performance again. When the propagation performance evaluated in this way reaches a peak, i.e., when the value of the evaluation function reaches a minimum value or a local minimum as a result of the correction of the layer thickness dn, the layer thickness dn of each layer designed at that time provides an optimal design value.

Optimal design carried out for constituent materials of the layers described above using the optical head design apparatus according to this embodiment produced the following optimal values: 2×d1=32 nm (SiO$_2$), d2=20 nm (ZnS), d3=20 nm (Si), d4=88 nm (SiO$_2$), d5=54 nm (Si), d6=140 nm (SiO$_2$), and d7=40 nm (Si). Whereas the complex propagation constant $\Lambda$ was Re($\Lambda$)=1.760 and Im($\Lambda$)=0.0541 (values in terms of effective refractive index) when the initial values of the layer thicknesses dn were provided, it was improved greatly to Re(Λ)=1.816 and Im(Λ)=0.029 by the optimal design.

Figure 7:
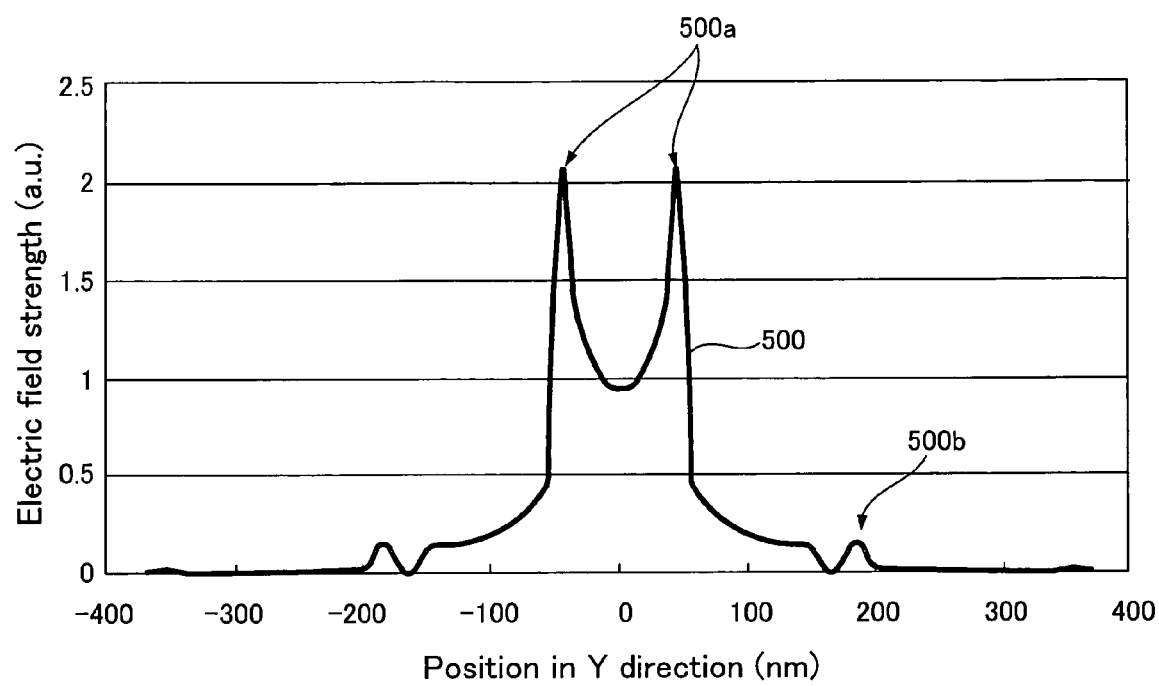
FIG. 7 is a graph showing an eigenfunction during optimal design.

FIG. 7 is a graph showing an eigenfunction during optimal design.

The abscissa in FIG. 7 represents the Y coordinates shown in FIG. 3 in nm while the ordinate represents eigenfunction values in arbitrary units.

During the optimal design, an eigenfunction 500 looks problematic at first glance because it gives two peaks 500a, but the peaks 500a exist within 50 nm from the center. Consequently, light is confined sufficiently within the first to third layers and the eigen function 500 has such a good waveform that the light will be propagated only along the center of the layered structure. As described later, the two peaks 500a has a small effect on the shape of the focused spot of the actual optical head. For the light propagation of the optical head, it is rather important that the peaks 500b in the side lobe will be small enough. In a design carried out using the optical head design apparatus according to this embodiment, changes in the shapes of eigenfunctions until an optimal design is achieved were analyzed, and it was confirmed that the peaks 500b in the side lobe were reduced remarkably when the total layer thickness of the fourth layers 44 and fifth layers 45 in FIG. 3 was smaller than the total layer thickness of the sixth layers 46 and seventh layers 47.

The actual electromagnetic field distribution obtained when the layered structure with the layer thicknesses thus designed optimally is applied to the optical head 10 shown in FIG. 2 cannot be checked using the waveform of the eigenfunction 500 alone. Simulation is required for the check.

Figure 8:
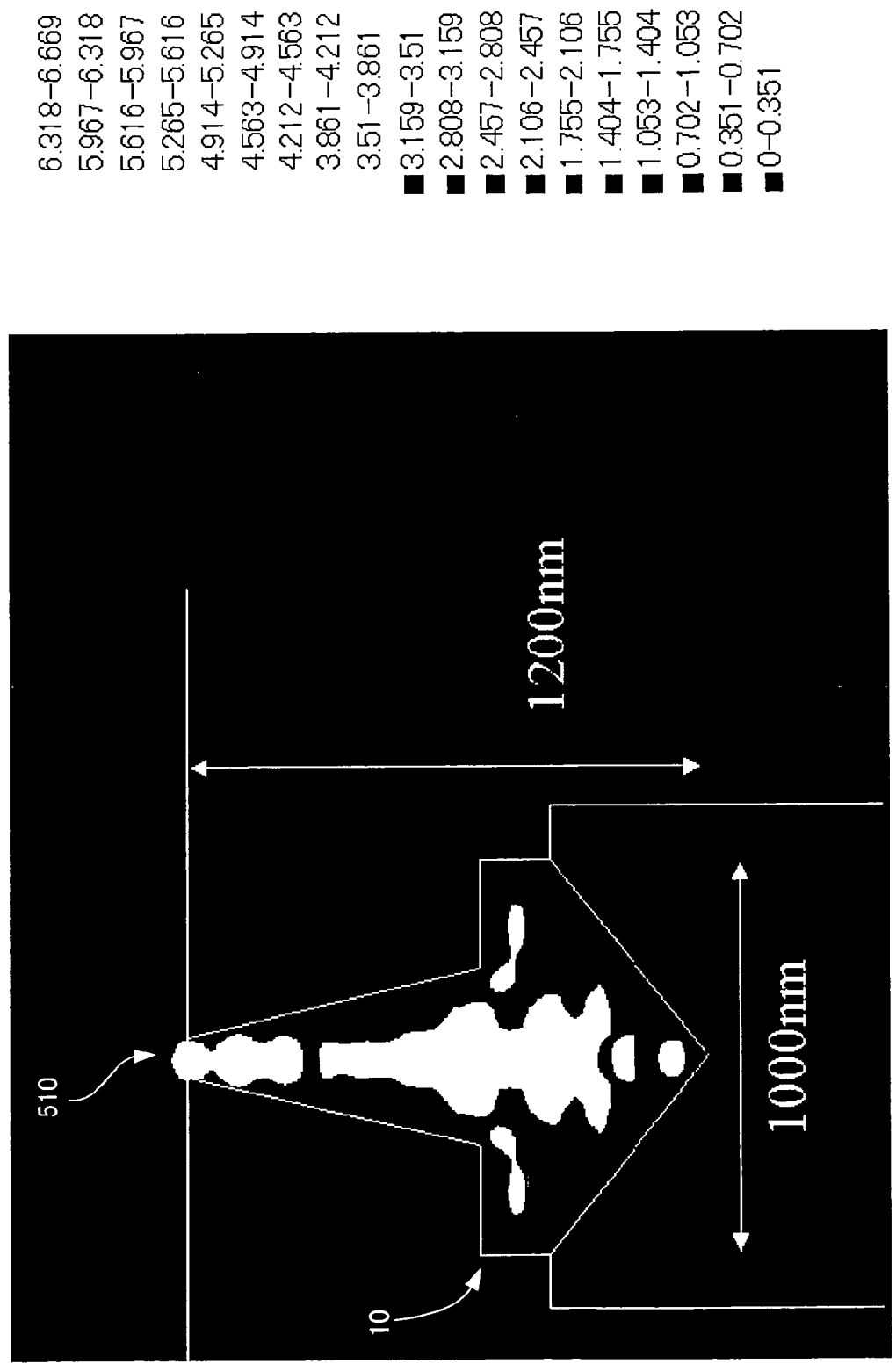
FIG. 8 is a plan view showing simulation results of an electromagnetic field during the optimal design.
Figure 9:
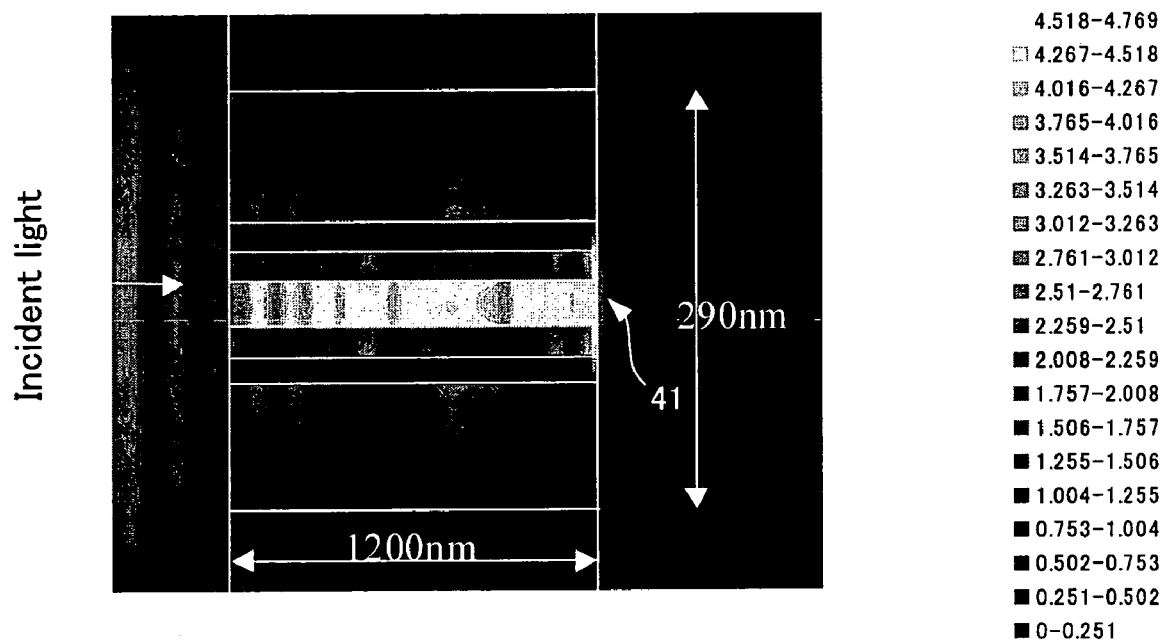
FIG. 9 is a side view showing the simulation results of the electromagnetic field during the optimal design.

FIG. 8 is a plan view showing simulation results of an electromagnetic field during optimal design and FIG. 9 is a side view showing the simulation results of the electromagnetic field during the optimal design.

FIGS. 8 and 9 show results of a rigorous electromagnetic field simulation conducted using an FDTD (Finite Difference Time Domain) method, where the brighter the area, the stronger the electromagnetic field. In the electromagnetic field simulation, the X and Z directions are divided into 140 cells each at 10-nm intervals while the Y direction is divided into 500 cells at 2-nm intervals. Incidentally, FIGS. 8 and 9 show the distribution of electromagnetic field strength in a steady state 30 cycles or more after light enters the optical head 10.

Layers of metal material may be used in the layered structure assumed to be a design target according to this embodiment. Thus, in the electromagnetic field simulation, Lorentz equation of motion of free electrons—which is a free electron model of metals—is used simultaneously with the FDTD method to give accurate solutions so that stable solutions can be calculated even if metal material which is a negative dielectric material is used.

From FIG. 9, it can be seen that there is an intense beam spot 510 at the tip of the optical head 10 although the optical head 10 is as long as 1200 nm in overall length which is approximately 10 times longer than available by conventional short-sighted design. The propagation efficiency was checked numerically and it was confirmed that propagation efficiency comparable to that of conventional short optical heads was available.

From FIG. 8, it can be seen that an electromagnetic field concentrates on the first layer 41, propagates through the optical head properly, and forms a beam spot at the tip.

The shape of the beam spot formed at the tip of the optical head 10 in this way will be described below.

Figure 10:
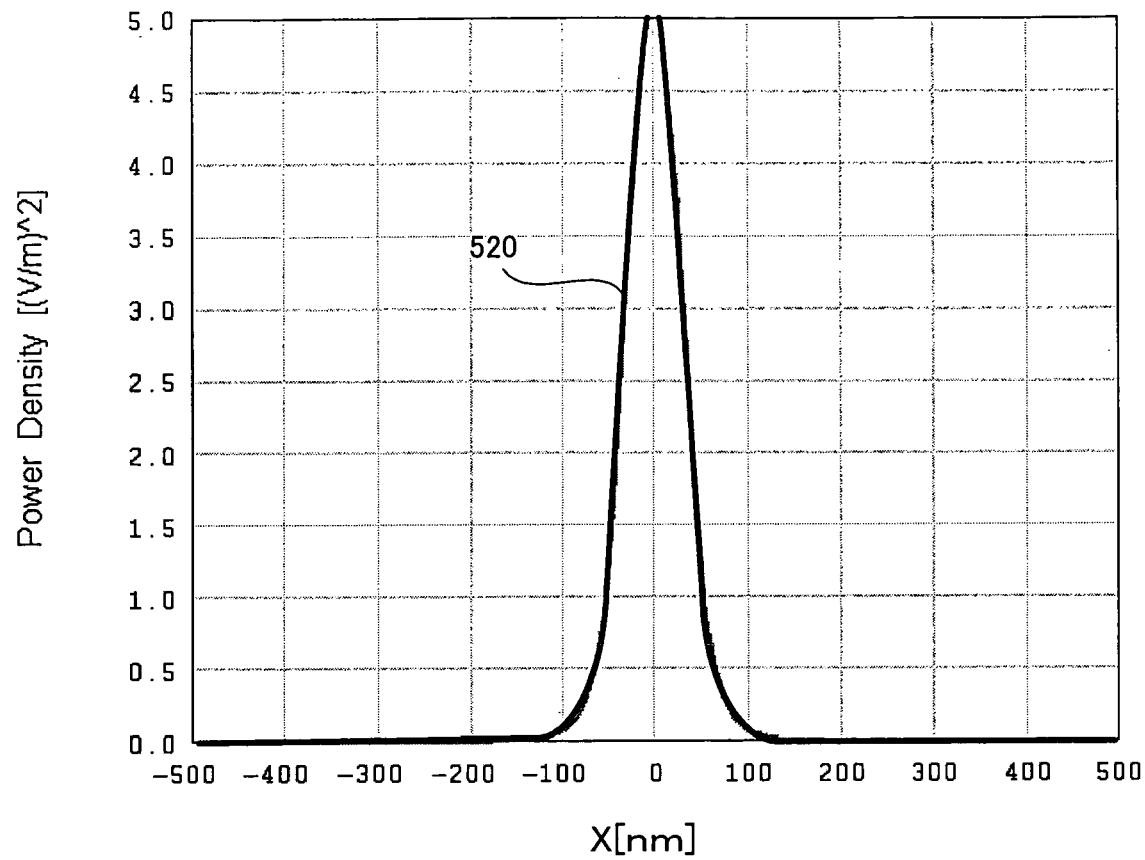
FIG. 10 is a graph showing a shape of a beam spot in the X direction during the optimal design.
Figure 11:
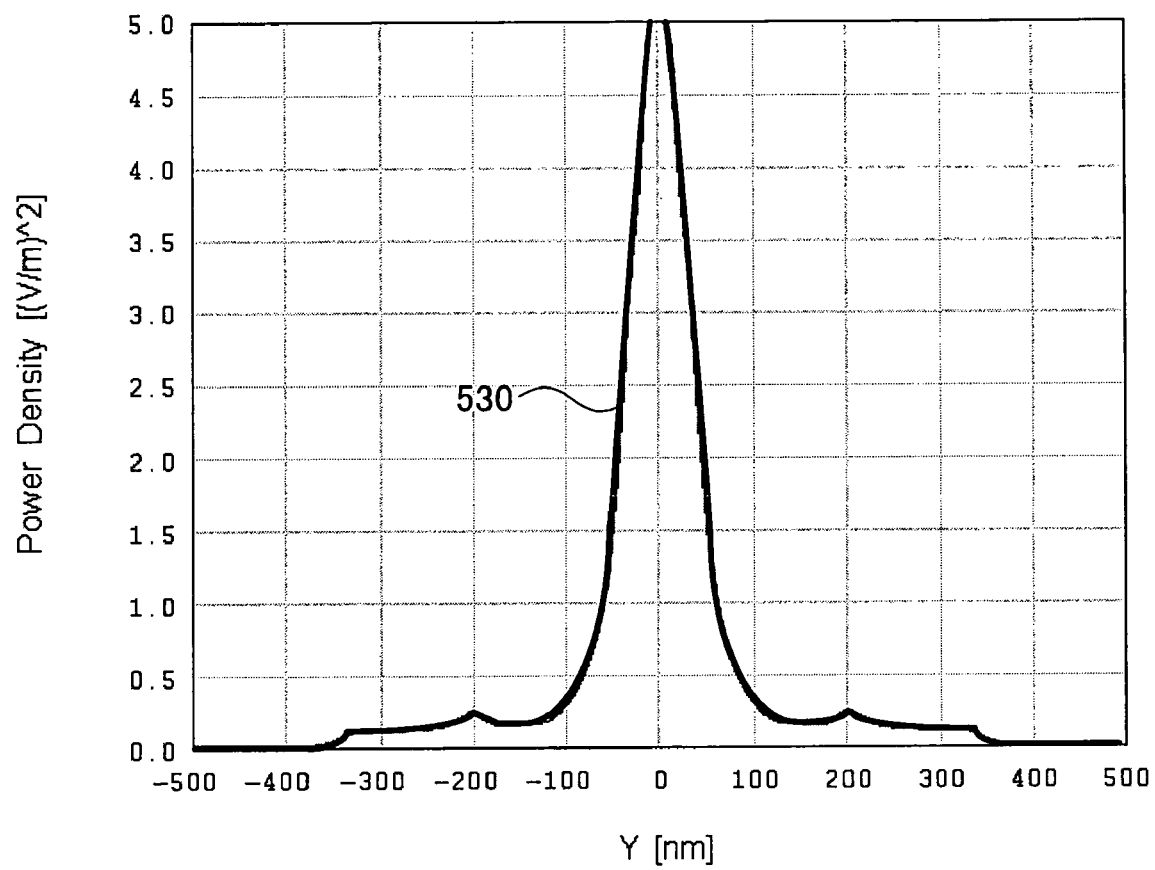
FIG. 11 is a graph showing a shape of the beam spot in the Y direction during the optimal design.

FIG. 10 is a graph showing a shape of a beam spot in the X direction during optimal design and FIG. 11 is a graph showing a shape of the beam spot in the Y direction during the optimal design.

The abscissas in FIGS. 10 and 11 represent X and Y coordinates, respectively while the ordinate represents electromagnetic field strength. Curves 520 and 530 in FIGS. 10 and 11 show envelopes of a beam spot at a distance of 15 nm from the tip of the optical head.

As shown in FIGS. 10 and 11, the beam spot has sufficiently small dimensions of approximately 90 nm in both X and Y directions. Also, a ratio of transmitted light, expressed as a ratio of emergent light intensity to incident light intensity, is 11.8%. Thus, it is confirmed that the optical head is very efficient. By mounting such a highly efficient optical head with a small spot size on the information storage apparatus shown in FIG. 1, it is possible to implement an information storage apparatus with a high storage density.

A second embodiment of the optical head according to the present invention will be described below. The second embodiment can be mounted on the information storage apparatus in place of the first embodiment of the optical head described above.

Figure 12:
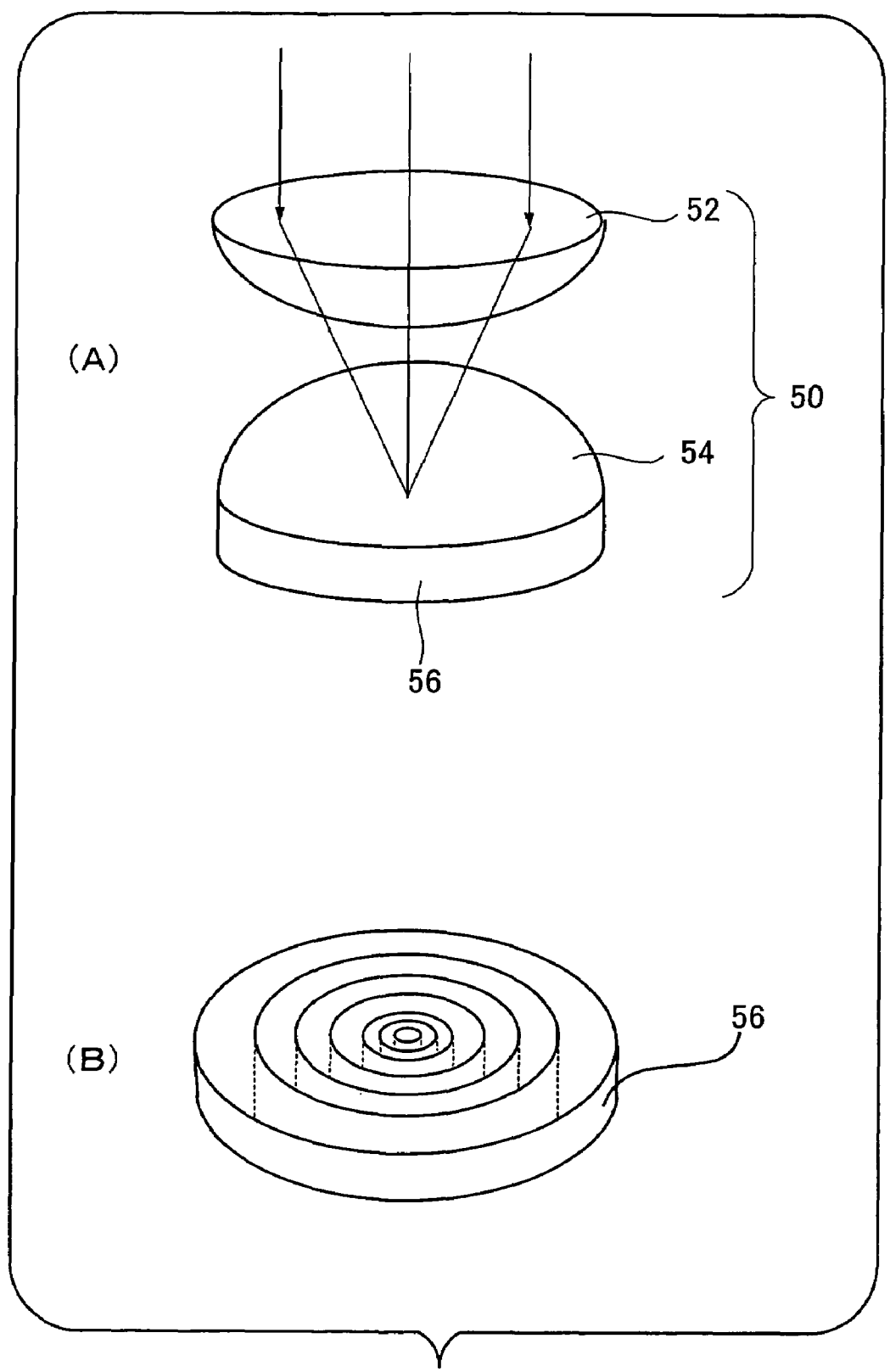
FIG. 12 is a diagram showing a second embodiment of the optical head according to the present invention.

FIG. 12 is a diagram showing the second embodiment of the optical head according to the present invention.

As shown in Part (A) of FIG. 12, an optical head 50 consists of an objective lens 52 and solid immersion lens composed of a hemisphere 54 and tubular portion 56. The light gathered by the objective lens 52 enters the hemisphere 54 of the solid immersion lens and guided to the tubular portion 56.

As shown in Part (B) of FIG. 12, the tubular portion 56 has a structure in which multiple tubes are placed coaxially. Sectional structure of the multiple tubes is similar to the layered structure shown in FIG. 3. The light guided to the tubular portion 56 is gathered at the center by interference among the multiple coaxial tubes to form an extremely small focused spot.

This concludes description of the embodiments of the present invention.

Incidentally, the optical head according to the present invention is not limited to the layered structure and coaxial multitubular structure described above. For example, it may have a lattice structure similar to the layered structure shown in FIG. 3 in each of two directions orthogonal to the optical axis.

Also, although an example in which the optical head is connected with an optical waveguide has been described above, the light guide section according to the present invention may be a laser diode, LED, or the like with a light-emitting surface connected to the optical head.

Also, although a magneto-optical information storage apparatus has been described above as an example, the information storage apparatus according to the present invention may be a phase-change or magnetic information storage apparatus, or it may be a playback-only machine which uses light for playback.

Also, although an optical head formed integrally with magnetic heads has been described above as an example, the optical head according to the present invention may be manufactured separately from the magnetic heads.

Also, although an optical head incorporated in an information storage apparatus has been described above as an example, the optical head according to the present invention may be used for light machining and the like, and its uses are not limited.

The invention claimed is:

1. An optical head, comprising:
   a first propagation section made of a first low extinction material and installed along an optical axis from an incident point to an emergent point of light, where the first low extinction material has a complex refractive index whose imaginary part is virtually negligible;
   a pair of second propagation sections which are made of a second low extinction material and sandwich the first propagation section in at least one cross-axis direction intersecting the optical axis, where the second low extinction material has a complex refractive index whose imaginary part is virtually negligible and whose real part is larger than the real part of the complex refractive index of the first propagation section;
   a pair of first confining sections which are made of a material with light propagation capability lower than the light propagation capability of the second propagation sections, with zero light propagation capability being acceptable and further sandwich the first propagation section and the second propagation sections from outside the second propagation sections in the cross-axis direction; and
   a pair of third propagation sections which are made of a material with light propagation capability higher than the light propagation capability of the first confining sections and further sandwich the first confining sections from outside in the cross-axis direction, and are thicker in the cross-axis direction than the first confining sections.

2. The optical head according to claim 1, further comprising:
   a pair of second confining sections which are made of a material with light propagation capability lower than the light propagation capability of the third propagation sections, with zero light propagation capability being acceptable, further sandwich the third propagation sections from outside in the cross-axis direction, and are thicker in the cross-axis direction than the first confining sections;
   a pair of fourth propagation sections which are made of a material with light propagation capability higher than the light propagation capability of the second confining sections and further sandwich the second confining sections from outside in the cross-axis direction; and
   a pair of third confining sections which are made of a material with light propagation capability lower than the light propagation capability of the fourth propagation sections, with zero light propagation capability being acceptable and further sandwich the fourth propagation sections from outside in the cross-axis direction.

3. The optical head according to claim 1, wherein the fourth propagation sections and the third confining sections are made of the same materials as the third propagation sections and the second confining sections, respectively, and have a total thickness in the cross-axis direction larger than total thickness of the third propagation sections and the second confining sections.

4. An information storage apparatus which emits light to a predetermined information storage medium and uses the emitted light for at least one of information reproduction and information recording, comprising:
   an optical head; and
   a light guide section which admits light through an incident point of the optical head into the optical head, wherein the optical head has:
   a first propagation section made of a first low extinction material and installed along an optical axis from an incident point to an emergent point of light, where the first low extinction material has a complex refractive index whose imaginary part is virtually negligible;
   a pair of second propagation sections which are made of a second low extinction material and sandwich the first propagation section in at least one cross-axis direction intersecting the optical axis, where the second low extinction material has a complex refractive index whose imaginary part is virtually negligible and whose real part is larger than the real part of the complex refractive index of the first propagation section; and
   a pair of first confining sections which are made of a material with light propagation capability lower than the light propagation capability of the second propagation sections, with zero light propagation capability being acceptable and further sandwich the first propagation section and the second propagation sections from outside the second propagation sections in the cross-axis direction.

5. The information storage apparatus according to claim 4, further comprising a magnetic head formed integrally with the optical head,
   wherein the magnetic head applies a magnetic field to the information storage medium and the applied magnetic field is used for at least one of information reproduction and information recording.

6. The information storage apparatus according to claim 4, wherein the optical head approaches to one tenth the wavelength of the emitted light or less from the information storage medium.

7. An optical head design apparatus comprising:
   a thickness setting section which sets thickness of each layer in an optical head which has a layered structure in at least one cross-axis direction intersecting an optical axis from an incident point to an emergent point of light;
   a propagation constant calculation section which calculates a complex propagation constant which represents light propagation capability along the optical axis by solving an equation containing the complex propagation constant as a variable and expressed in terms of the product of F matrices of layers which represent propagation of an electromagnetic field across the respective layers and a boundary condition that impedance (magnetic field/electric field) on the optical axis is zero, where each of the F matrices is given by

[Formula 1]

$$F_n = \begin{bmatrix} \cos(\beta_n d_n) & \dfrac{ik_0 \varepsilon_n}{\beta_n} \sin(\beta_n d_n) \\ \dfrac{i\beta_n}{k_0 \varepsilon_n} \sin(\beta_n d_n) & \cos(\beta_n d_n) \end{bmatrix} \quad (1)$$

(where $d_n$ is thickness of the n-th layer, $\varepsilon_n$ is complex permittivity of the n-th layer, $\beta_n = \sqrt{(\varepsilon_n k_0^2 - \Lambda^2)}$ is a phase propagation constant of the n-th layer, $k_0$ is a wave number of incident light, and $\Lambda$ is the complex propagation constant which, being common to the layers, represents light propagation capability along the optical axis);

a performance evaluation section which evaluates light propagation performance in the layered structure based on the complex propagation constant calculated by the propagation constant calculation section; and a thickness correction section which makes the propagation constant calculation section recalculate the complex propagation constant, by correcting the thicknesses of the layers based on results of the evaluation made by the performance evaluation section.

8. The optical head design apparatus according to claim 7, wherein the performance evaluation section makes an evaluation by approving a large real part of the complex propagation constant and disapproving a large imaginary part of the complex propagation constant.

9. An optical head design program storage medium that stores an optical head design program which, when installed on a computer, constructs on the computer:

a thickness setting section which sets thickness of each layer in an optical head which has a layered structure in at least one cross-axis direction intersecting an optical axis from an incident point to an emergent point of light;

a propagation constant calculation section which calculates a complex propagation constant which represents light propagation capability along the optical axis by solving an equation containing the complex propagation constant as a variable and expressed in terms of the product of F matrices of layers which represent propagation of an electromagnetic field across the respective layers and a boundary condition that impedance (magnetic field/electric field) on the optical axis is zero, where each of the F matrices is given by

[Formula 2]

$$F_n = \begin{bmatrix} \cos(\beta_n d_n) & \dfrac{ik_0 \varepsilon_n}{\beta_n} \sin(\beta_n d_n) \\ \dfrac{i\beta_n}{k_0 \varepsilon_n} \sin(\beta_n d_n) & \cos(\beta_n d_n) \end{bmatrix} \quad (1)$$

(where $d_n$ is thickness of the n-th layer, $\varepsilon_n$ is complex permittivity of the n-th layer, $\beta_n = \sqrt{(\varepsilon_n k_0^2 - \Lambda^2)}$ is a phase propagation constant of the n-th layer, $k_0$ is a wave number of incident light, and $\Lambda$ is the complex propagation constant which, being common to the layers, represents light propagation capability along the optical axis);

a performance evaluation section which evaluates light propagation performance in the layered structure based on the complex propagation constant calculated by the propagation constant calculation section; and a thickness correction section which makes the propagation constant calculation section recalculate the complex propagation constant, by correcting the thicknesses of the layers based on results of the evaluation made by the performance evaluation section.

* * * * *